United States Patent [19]

Mukhin et al.

[11] 4,194,611
[45] Mar. 25, 1980

[54] VIBRATOR FOR IMPORTING VIBRATION TO A WORKING PLATFORM

[75] Inventors: Zhores G. Mukhin; Vladimir N. Vlasov, both of Novosibirsk; Alexei P. Mikhailov, Karasuk, all of U.S.S.R.

[73] Assignee: Institut Gornogo Dela Sibirskogo Otdelenia Nauk SSSR, Novosibirsk, U.S.S.R.

[21] Appl. No.: 958,147

[22] Filed: Nov. 6, 1978

[51] Int. Cl.² ................................. B65G 11/00
[52] U.S. Cl. .................................. 193/2 B; 198/768
[58] Field of Search ............ 193/2 R, 2 B; 198/768, 198/533; 209/245, 920; 221/204, 200; 222/199, 202, 203; 91/232

[56] References Cited

U.S. PATENT DOCUMENTS

| 2,071,373 | 2/1937 | Wurzbach et al. | 222/199 |
| 3,133,627 | 5/1964 | Lenders et al. | 198/768 |
| 3,212,630 | 10/1965 | Allen et al. | 198/768 |
| 3,813,950 | 6/1974 | Ebersole | 198/768 X |

FOREIGN PATENT DOCUMENTS

| 188893 | 6/1965 | U.S.S.R. | 198/768 |
| 287878 | 12/1970 | U.S.S.R. | 198/533 |
| 427833 | 4/1972 | U.S.S.R. | 198/768 |

Primary Examiner—Joseph E. Valenza
Assistant Examiner—Gene A. Church
Attorney, Agent, or Firm—Lackenbach, Lilling & Siegel

[57] ABSTRACT

A vibrator operated by a fluid medium under pressure for the purpose of imparting vibration to a working platform carrying the material being handled. The vibrator comprises a base, a forward stroke chamber formed by a continuous seal situated on the side of said base facing the working platform, and a striker mounted on said seal of the forward stroke chamber and adapted to interact with the working platform under the action of the fluid medium for the purpose of imparting vibration to said working platform. The vibrator also comprises a reverse stroke chamber formed by an additional continuous seal situated on the side of the striker facing the working platform and connected to the source of the fluid medium.

18 Claims, 11 Drawing Figures

VIBRATOR FOR IMPORTING VIBRATION TO A WORKING PLATFORM

The present invention relates to vibrators operated by a fluid medium, specifically by compressed air. Such vibrators are used, in particular, for operating vibratory conveyances, for example, vibratory conveyers and feeders designed for discharging and loading bulk material from outlets, hatches and containers.

The vibratory conveyers and feeders known in the prior art have a vibratory platform mounted on either the ground, a frame, supports or a suspension in a horizontal position or to make an angle of 20° with the horizontal. A vibrator is mounted on the ground underneath the vibrating platform or direct thereon. The location of the vibrator is approximately the middle of the vibrating platform or one of the ends thereof. The vibrator imparts oscillations to the vibrating platform in the direction perpendicular to the surface thereof or at an angle of 30° thereto. One end of the vibrating platform is under the discharge chute, the other is at the point of loading the bulk material into transport facilities (wagons, motor vehicles, and the like).

For vibratory conveyance, use is most often made of unbalance vibrators with an electric, pneumatic or hydraulic rotary motor. An unbalance vibrator comprises unbalance weights rigidly secured to the motor shaft or on a separate shaft. In the latter case the shaft runs in bearings mounted on a base-plate. To obtain directional oscillations, use is made of two parallel shafts with unbalance weights arranged to be driven through gearing in opposite directions in order that the weights rotate in antiphase.

Usually the motor is mounted directly on a vibrating plate or on a separate stationary base and is connected to the weight shaft through a flexible shaft, a cardan drive or the like.

Such vibrators create shockless alternating sinusoidal loads which impart to the vibrator plate an oscillating motion by virtue of which bulk material is transported.

Said vibrators suffer from the disadvantage that they have a complicated construction, heavy weight and low operating dependability in dusty, abrasive and aggressive media, for example, such as those encountered in mining.

Another disadvantage is that said vibrators have no provision for automatically matching the exciting force to the actual oscillations of the vibrating plate, which leads to vibrator overloading. In these circumstances the driving electric motor often operates under starting or stall torque conditions. Such operating conditions in combination with heavy vibration loads cause premature failure of the electric motor. In order to diminish the influence of the aforesaid factors, the power of the rotary motor has to be increased. This, however, leads to overloading and failure of the unbalance weight shaft bearings. Bearing overload occurs when the direction of the disturbance force does not coincide with the elastic forces of the oscillations of the vibrating plate.

Pneumatic and hydraulic rotary motors always comprise an expensive precision-made kinematic pair, for example, a rotor and a stator, a piston and a cylinder, a gear and a pinion. To protect such a pair from rapid wear, it is necessary to thoroughly purify the power medium, for example, with compressed air, to continuously supply lubricant to the rubbing surfaces and provide constant attention and maintenance. Said motors have low operating dependability in wet, aggressive and dusty conditions, for example, such as those encountered in mining.

The transportation of bulk material can be rendered more efficient by impact disturbance of the vibrating plate. There are known in the art piston-type pneumatic or hydraulic impact-action vibrators. They comprise a housing with a cylinder, a hammer-type piston movably mounted in the cylinder, and a system for admitting and exhausting a power medium. The timing function is often fulfilled by the piston itself for which purpose the piston and the cylinder are provided with ports and control edges. Such vibrators also need thorough purification of the power medium and continuous lubrication of the piston and associated parts and give poor performance in wet and abrasive conditions. Usually the speed of the piston just before a blow exceeds 5-6 m. This weakens the vibrator and associated conveyance by giving rise to quickly developing microcracks in the material of the parts and consequent failure thereof. To decrease the impact velocity, the diameter of the piston and cylinder has to be enlarged. This expedient, however, is uneconomical and causes constructional difficulties in the power medium timing arrangement due to decrease in the piston stroke.

Also known in the prior art are diaphragm-type vibrators wherein provision is made of a power chamber formed by a housing and a diaphragm. The diaphragm acts through an intermediate part onto the vibrating plate of the associated conveyance. Port timing of the power medium is mainly employed, a port valve being operated by the diaphragm. Such vibrators are devoid of some of the disadvantages mentioned above. However, they suffer from the disadvantage that there are constructional difficulties in the exhaust timing arrangement due to small movement of the diaphragm. The port timing, also calls for purification of the power medium, continuous lubrication and protection from abrasive particles.

There is known a diaphragm-type vibrator for operating a vibratory conveyance wherein the working platform is mounted on supporting means which enable it to move endways and is provided with a spring device whereby it is returned into the initial position. The vibrator housing is stationary with respect to the working platform. The working chamber inside the housing has one resilient wall which is made in the form of a diaphragm attached around the periphery. Inside the housing is mounted the working chamber. Secured in the center portion of the diaphragm is a rigid ring which has a center hole communicating with the working chamber. The ring has a sealing shoulder arranged to mate with the valve and is adapted to move together with the center portion of the diaphragm up to a ring stop mounted on the housing. The valve is mounted on a stem attached to the end of the working platform.

During operation, compressed air enters the working chamber through an admission arrangement and acts upon the diaphragm. The diaphragm flexes and its center portion moves a short distance together with the rigid ring attached thereto. The sealing shoulder of the rigid ring presses against the valve and transmits the force from the diaphragm center portion through the valve and its stem to the working platform. Said force causes the working platform to move endways, compressing the return spring. During this movement the diaphragm's rigid ring comes up against the stop, thereby preventing the diaphragm from further movement, while the working platform continues moving due to inertia, carrying the valve therewith. The valve is thus unseated from the diaphragm ring for the compressed air to escape from the working chamber into the atmosphere by way of the clearance space between the valve and the diaphragm ring and via the center hole in the diaphragm ring. By this instant entry of compressed gas into the working chamber is discontinued by the admission arrangement located in the housing. Thereafter the diaphragm together with the ring returns into the initial position by virtue of its resilience and other special means. The working platform is moved back by the return spring until the valve is seated upon the diaphragm ring. Now the working chamber is sealed off, compressed air is admitted into it and the cycle is repeated.

The vibrator described above has not found wide use because of insufficient power. The force developed in its working chamber cannot be fully transmitted through the diaphragm to its center ring and the working platform inasmuch as the working surface of the diaphragm decreases rapidly during flexure. This is attributed to the fact that the diaphragm stretches to the limit of its deformation and thereafter takes no part in the useful work of moving the working platform.

A further disadvantage is that said vibrator is of complicated design and has intricate inlet and exhaust arrangements which are not reliable and wear out rapidly in dusty and abrasive conditions.

Also known in the art are seal-type impact vibrators operating on a fluid medium and used, in particular, for driving vibratory conveyances such as conveyers and feeders. These vibrators are operated by active blows from a striker oscillating under the action of fluid pressure in a working chamber.

These vibrators have a base fixedly mounted on a working plate by means of rigid or flexible connecting elements. Mounted on the base is a seal having at least one outlet hole. Mounted on the seal is a striker adapted to interact with the working platform under the action of the fluid pressure in the working chamber. The seal may have any rational form appropriate for the flexible sealing edges of the outlet hole to seal the working chamber and to unseal the same for exhausting the fluid medium therefrom at the end of the forward stroke of the striker. The unsealing of the working chamber is effected by limited flexing-out of the sealing edge of the seal outlet hole. The flexing-out of the sealing edge is limited either by increasing the resilience of the seal or by fitting a special limiting device. Said limiting device may be constructed so as to provide for smooth variation in the flexing-out movement of the sealing edge. The seal can be mounted between the striker and the base without recourse to rigid fastening, or secured to one of them, or else rigidly secured to both the striker and base, in which case the seal can hold the striker from sidewise movement with respect to the base. If the vibrator has no base the striker is connected to the working platform by means of resilient elements (springs) and the seal is mounted between the striker and the working platform.

The vibrators under consideration operate as follows:

When turned on, the fluid medium passes under pressure through a throttle orifice or, for example, a valve arrangement into the working chamber, building up overpressure therein. The pressure in the working chamber causes the striker to make a forward stroke and strike the working platform. On the striker forward stroke, before a blow is delivered, the elastic edge of the seal, in virtue of its resilience or by the agency of a limiting device, comes out of contact with the sealing surface, forming an exhaust passage therebetween for the fluid medium to exhaust therethrough into the surrounding medium. The sealing surface which periodically mates with the seal edge can be provided on the striker or on the base, depending on the construction of the seal or the place where it is installed or secured. After the pressure in the working chamber falls off, the seal edge, by virtue of its resilience, tends to take its initial position due to which the flow area of the exhaust passage is increased and the exhaust passage is held open for a longer time, which promotes the fluid exhaust from the working chamber. After the blow, the striker makes a reverse stroke under the action of rebound and the striker's own weight, possibly assisted by return springs if they are provided. At the end of the reverse stroke the entire sealing surface of the seal comes into contact with the sealing surface of the base or the striker, whereby the working chamber is sealed off and the pressure therein builds up as the process begins therein of the compression by working chamber and a new charge of the fluid medium being fed into the chamber. The striker stops and, being forced by the pressure in the working chamber, makes a forward stroke. Thus the cycle commences all over again. If the working chamber is located between the striker and the working platform, the vibrator works in a similar way.

The vibrators feature single blows of high energy and high frequency and, consequently, substantially high impact power.

However, spite of the many positive qualities, the frequency of their blows is not sufficiently high with limited dimensions. Furthermore, the return springs are not reliable in operation under impact loads and are prone to premature failure. For this reason it is difficult to provide a high-frequency vibrator with substantially high energy single blows and sufficient service life.

These vibrators also suffer from the disadvantage that the return springs required for operation at high fluid pressure (above 10–15 kgf/cm$^2$) have higher dimensions, weight and cost, while their service life is short.

There is need in many applications for vibrators possessing high impact energy, high operating frequency, and small unit weight and size per impact power, capable of operating on fluid for driving, in particular, powerful vibratory conveyances intended for transporting viscid materials subject to caking, for example, wet clay.

It is an object of the present invention to provide seal type vibrators possessing high frequency energetic single blows, capable of dependably operating in difficult surrounding medium conditions with a sufficiently long service life.

It is a further object of the present invention to provide a powerful vibrator whose striker has low preimpact speeds.

It is a still further object of the present invention to provide a vibrator having small unit weight and size per impact power.

It is a still further object of the present invention to provide a vibrator of simple construction, with low consumption of fluid medium and high efficiency.

It is a still further object of the present invention to provide a seal-type vibrator capable of regulating the energy of single blows.

It is a still further object of the present invention to provide a vibrator having a wide field of application.

These and other objects are achieved in a vibrator powered by a fluid medium under pressure for the purpose of imparting vibration to a working platform carrying the material being handled. The vibrator comprises a forward stroke chamber formed by a vibrator base and a continuous seal situated on the side of the vibrator base facing the working platform and arranged to carry a striker adapted to operate under the action of the fluid medium for the purpose of imparting vibration to the working platform. According to the invention, the vibrator is provided with a reverse stroke chamber formed by an additional continuous seal situated on the side of the striker facing the working platform and connected to the source of the fluid medium.

The provision of the forward stroke chamber and the reverse stroke chamber makes it possible to produce active impact disturbance of the working platform in both opposite directions. The construction of the vibrator is simple and permits of dependable operation in difficult dusty, abrasive, moist and even wet conditions. The vibrator can possess substantially high frequency and energy of single blows and, if desired, low pre-impact speeds of the striker can be obtained.

It may be desirable in some cases that the working volume of the reverse stroke chamber be less than the working volume of the forward stroke chamber. By this simple expedient we can obtain, in one direction, impact or impactless disturbance of the vibrating platform with less energy, which may be desirable for many vibratory devices and mechanisms.

If the nature of operation of the device involved calls for impact disturbance of the working platform in one direction and impactless disturbance in the other direction, it is advantageous to constantly seal off one of the chambers from the surrounding medium and put it in communication with the other chamber via a passage provided in the striker.

This gives a simple vibrator construction which can be further simplified by rigidly connecting one side of the seal of the constantly sealed-off chamber to the striker and the other side to the base or the working platform. This expedient makes it possible, without recourse to other special means, to hold the striker securely enough from sidewise movement in the plane perpendicular to the direction of its reciprocating movement. Such vibrators operate well on compressed gas. However, if the seal of the constantly sealed-off chamber is made of elastic material, for example, rubber, the vibrator can also operate with a liquid power medium. Besides, in this vibrator the constantly sealed-off chamber must of necessity be constructed so as to have its working volume less than the working volume of the other chamber.

To simplify the construction of the vibrator, it is desirable that the feed line designed for supplying the fluid medium to the working chambers be connected to a passage provided in the body of the striker and communicating with the forward and reverse stroke chambers. This simplifies the feed of the fluid medium to the reverse stroke chamber.

In order to increase the efficiency of the vibrator, it is desirable that at least one valve be provided for the purpose of alternately feeding the fluid medium into the working chambers.

This expedient makes it possible to reduce the fluid medium consumed by the vibrator inasmuch as it shuts off the supply of the fluid medium during exhaust from the chambers, thereby preventing the fluid medium from being needlessly discharged into the atmosphere.

To simplify the vibrator design, it is appropriate to locate the valve in the body of the striker. This improves the arrangement of the vibrator and obviates the need for installing the valve outside the striker or secure it to the striker surface.

It may be desirable in many cases that the vibrator be provided with an amplitude regulator for the striker oscillations.

The provision such a regulator will permit of varying the energy of single vibrator blows over a wider range. For example, blow energy can be reduced, thereby permitting blow frequency to be increased at the same time. In combination with other methods of regulation, this expedient increases several times the range of varying the operating characteristics of the vibrator.

In some cases it may be desirable to mount the striker on the vibrator base or on the working platform in such a manner as to adapt it for reciprocating between the working platform and the base.

This constructional arrangement provides for more precise directional reciprocating movement of the striker and, consequently, improves the stability of vibrator operation by obviating the possibility of striker misalignment in the plane parallel to the vibrator base.

A number of vibrators constructed in accordance with the present invention have been created. These vibrators can be regulated for both impact and impactless operation in one or both directions.

Now the invention will be described in detail with reference to the accompanying drawings in which.

For clarity in describing the embodiments of the present invention depicted in the accompanying drawings, use is made of concrete, narrow terminology. It will be noted, however, that each term embraces all the equivalent elements working in an analogous way and used for the same objectives. Thus, the term "seal" is taken to include all the flexible or elastic elements of various shapes, which hermetically seal, although in one place only, the working chamber of the vibrator under the action of the fluid medium in said chamber. The term "working volume of the working chamber" denotes the volume of the working chamber equal to its maximum volume available by the instant at which unsealing of the chamber commences less the volume of the chamber at the instant when it is fully compressed by the striker. The term "active area of the striker" denotes the area bounded by the line of contact between the side surface of the seal and the striker surface, said area taking up the pressure exerted in the working chamber involved.

Figure 1:
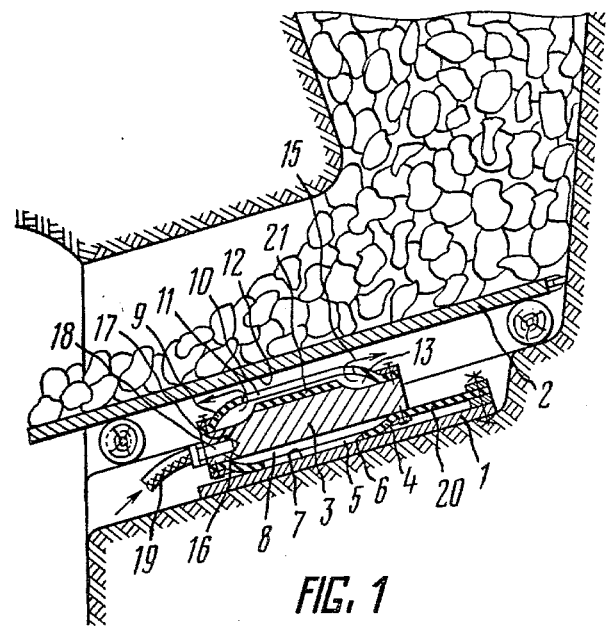
FIG. 1 is a diagrammatic view of the impact vibrator constructed according to the invention and comprising a forward stroke chamber and a reverse stroke chamber, the vibrator base being mounted fixedly.
Figure 2:
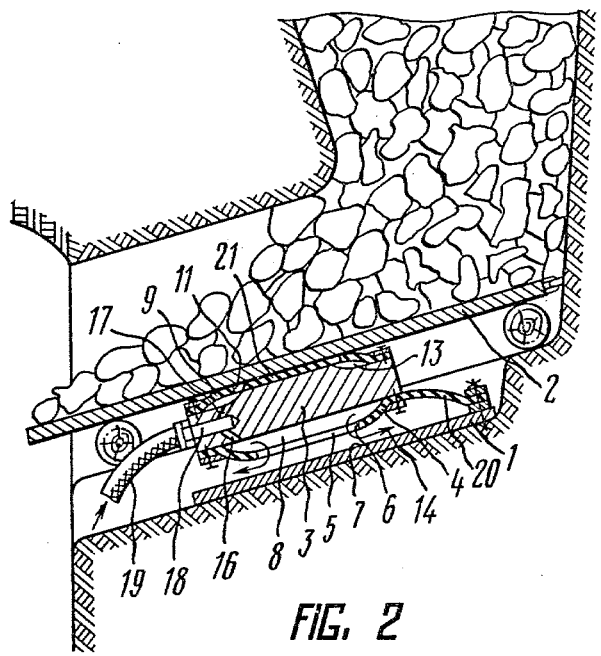
FIG. 2 is a view of the same, showing the striker at the instant of striking the working platform.

The vibrator depicted in FIGS. 1 and 2 is used in conjunction with a vibratory conveyance, specifically, a vibratory feeder installed in a mine gravity-discharge passage for delivering the mined material to transport facilities (not shown), for example, a conveyor, a wagon or a motor vehicle.

The vibrator has a base 1. In the embodiment under consideration the base is mounted fixedly on the discharge passage ground direct under a working platform 2 which, in this particular case, has a large area and fulfils the function of the feeder vibrating platform. One end of said platform is located under the discharge chute to receive gravity-discharged mined material. The other end of the platform is inclined and extends towards the transport facility (not shown). A striker 3 is located between the base 1 and the working platform 2. Installed between the base 1 and the striker 3 is a seal 4 which has at least one outlet hole 5 with a flexible, sealing edge 6 designed to be periodically pressed against a sealing surface 7 on the base 1 for the purpose of sealing off a forward stroke chamber 8. Installed between the striker 3 and the working platform 2 is a seal 9 which also has at least one outlet hole 10 with a flexible, movable edge 11 designed to be periodically pressed against a sealing surface 12 on the working platfrom 2 for the purpose of sealing off a reverse stroke chamber 13.

Figure 3:
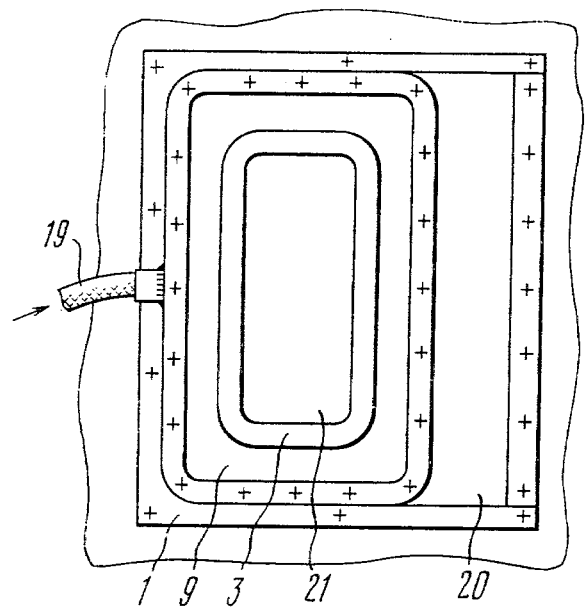
FIG. 3 is a plan view of the same, with the working platform removed.

In this embodiment the seals 4 and 9 are of plain flat form and are secured to the striker 3 around the periphery. However, each of these seals can have any rational form appropriate for sealing off the respective working chamber on the corresponding stroke of the striker 3 and unsealing same at the end of the corresponding striker stroke. Seals 4 and 9 can be made of flexible or elastic material which provides sufficient strength, resilience and lastability, for example, polymer, rubber or even metal or combination thereof. Good results are obtained with rubberized fabric seals. For high-pressure operation, such seals can be reinforced with a polymer or steel fabric, netting or wire. For higher pressures, the seals can be made of steel and its sealing edges coated with an elastic material. In various embodiments of the invention the seals 4 and 9 can be mounted without recourse to rigid fastenings or, for example, secured to the striker 3 as shown in FIGS. 1 to 3, or else secured to the base 1 and the working platform 2 respectively. Both seals or one of them can be rigidly secured on either side, i.e. secured to the striker 3 at one side and to the base 1 at the other.

The flexible, movable edges 6 and 11 of the outlet holes 5 and 10 of the seals 4 and 9 respectively, or at least one portion of said edges, should flex out for a smaller distance than the stroke of the striker 3, i.e. the amplitude 61 of striker oscillation between the base 1 and the working platform 2. This condition is necessary in order to form outlet passages 14 (FIG. 2) and 15 (FIG. 1) respectively between the sealing edges 6 and 11 of the seals 4 and 9 and the sealing surfaces 7 and 12 of the base 1 and the working platform 2, which passages serve the purpose of periodically connecting the working chambers 8 and 13 with the surrounding medium and exhausting waste fluid medium therefrom. The flexing out of the seal edges 6 and 11 can be limited by various constructional expedients, for example, by using special limiting devices in the form of flexible connecting elements designed to stop said edges at the required point. An alternative method is to increase the rigidity of the movable portion of the seal, for example, by using a thicker or stiffer material. In the embodiment of the invention depicted in FIGS. 1 to 3 the limitation of the movement of the flexible edges 6 and 11 of the outlet holes 5 and 10 of the seals 4 and 9 is effected by selecting the material, the width of said edges 6 and 11, and the form of said outlet holes 5 and 10 so that, in combination, these factors provide the required maximum flexing-out of the edges 6 and 11 at the estimated pressure of the fluid. In the embodiment of the invention depicted in FIGS. 1 to 3 the edges 6 and 11 flex out to the required limit a round the entire periphery of the working chambers 8 and 13, whereby provision is made for efficiently exhausting the waste fluid medium from the working chambers. In plan, i.e. in the planes parallel to the base 1 and the working platform 2, the working chambers 8 and 13 can have any form desirable from a construction viewpoint, for example, round, square, or other, as dictated by the room available for the installation of the vibrator. Referring to FIGS. 1 to 3, the working chambers 8 and 13 are of parallelogram form in plan. The fluid medium under pressure passes into the working chambers 8 and 13 through throttling passages 16 and 17 respectively and a passage 18, which passages are situated in the striker 3. A supply line is connected to the passage 18, for example, by means of a hose 19 which can be attached, for example, to the striker 3. The weight of the striker 3 is chosen so as to obtain the required pre-impact speed. The striker 3 can be prevented from sidewise displacement in the plane parallel to the base 1 by many various means. In the embodiment of the invention depicted in FIGS. 1 to 3 the striker 3 is prevented from sidewise displacement by the use of a flexible connection 20 made in the form of a sheet of a resilient material (rubber, metal, polymer, etc.) one end of which is attached to the striker 3 and the other end is attached to the base 1. Alternatively, said other end can be attached to the working platform 2. In order to cushion shock loads, an elastic spacer 21 made, for example, of rubber or rubbberized fabric, can be mounted between the striker 3 and the working platform 2.

Figure 4:
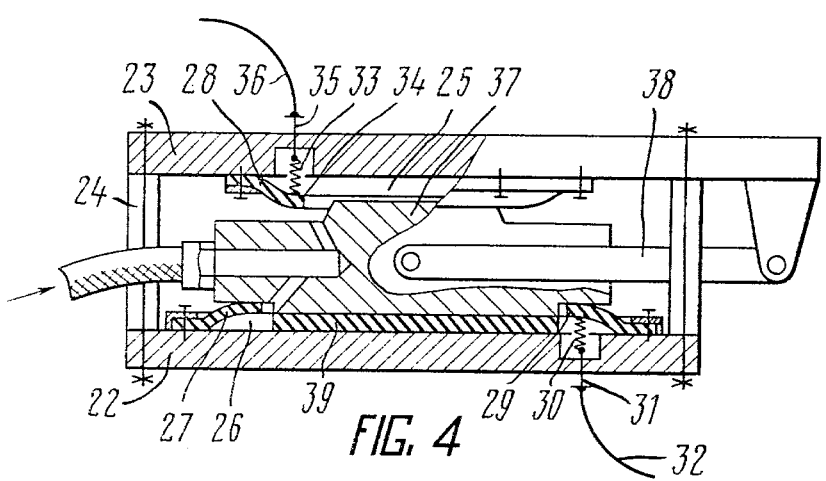
FIG. 4 is a diagrammatic view of the vibrator constructed according to the invention, wherein the working volume of the reverse stroke chamber is less than the working volume of the forward stroke chamber.

In the embodiment of the invention depicted in FIG. 4 the vibrator base 22 is connected to the working platform 23 by means of links 24. The working volume of the reverse stroke chamber 25 is less than the working volume of the forward stroke chamber 26. The seal 27 is the forward stroke chamber 26 is attached to the base 22, whereas the seal 28 of the reverse stroke chamber 25 is attached to the working platform 23. The flexible, movable sealing edge 29 of the exhaust hole in the seal 27 is provided with a limiting device 30 designed to limit the flexing-out of said edge and constructed in the form of spring one end of which is secured to the edge 29 of the seal 27 and the other end is attached to an adjusting screw 31 installed in the base 22. A flexible shaft 32 can be connected to the adjusting screw 31 for remote control of the adjustment. The spring-type limiting device 30 is also helpful for brisk and positive return of the edge 29 into the initial position. A similar limiting device 33 can be provided at the reverse stroke chamber 25 for the purpose of limiting the flexing-out of the edge 34 of the outlet hole in the seal 28. For example, this device can be made in the form of a spring one end of which is attached to the edge 34 and the other end is secured to an adjusting screw 35 installed in the working platform 23. A flexible shaft 36 can be connected to the adjusting screw 35 for the purpose of remotely operating the adjusting screw 36 and thereby remotely adjust the limiting device 33. Here, the spring type limiting device 33 also facilitates brisk and positive return of the edge 34 into the initial position. In this embodiment of the invention the striker 37 is prevented from sidewise displacement in the plane parallel to the base 22 or the working platform 23 by the use of a two-member linkage 38 articulated to the striker 37 on a line passing through the center of its mass. The other end of the linkage 38 is connected to the working platform 23. To reduce impact loads on the elements of the links 24, an elastic spacer can be installed on the side of the striker 37 which makes contact with the base 22. The fluid medium can be supplied to the working chambers 26 and 25 in the same manner as in the embodiment shown in FIGS. 1 to 3.

Figure 5:
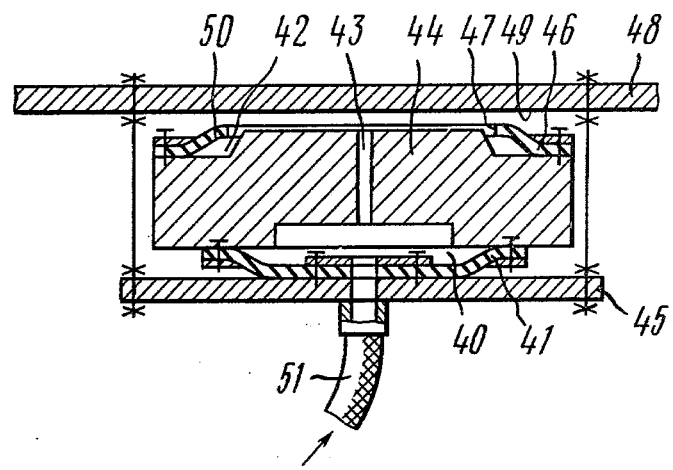
FIG. 5 is a diagrammatic view of the impact vibrator constructed according to the invention, wherein the forward stroke chamber communicates with the reverse stroke chamber.

FIG. 5 depicts a further embodiment of the invention wherein one of the chambers, particularly the forward stroke chamber 40 is constantly sealed off from the surrounding medium by the seal 41 and connected with the source of the fluid medium and the other chamber, viz. the reverse stroke chamber 42, by means of a throttling passage 43 provied in the striker 44. In order to simplify the construction of the vibrator, it is desirable that the seal 41 should be hermetically attached at one side to the striker 44 and at the other side to the base 45. It is further desirable that the seal 46 of the reverse stroke chamber 42 be secured to the striker 44 so that its outlet hole 47 is towards the working platform 48. It is still further desirable that a sealing surface 49 be provided on the working platform 48 for the flexible edge 50 of the outlet hole 47 of the seal 46 to come periodically into contact with said sealing surface, thereby forming a hermetically sealed joint. In this embodiment of the invention the striker 44 is held from sidewise displacement on the base 45 by the seal 41. The fluid medium is fed direct into the forward stroke chamber 40 through a hose 51 connected to the base 45. The base 45 is attached to the working platform 48. To enable the vibrator to operate, it is necessary that the active area of the striker 44 acted upon by the pressure in the forward stroke chamber 40 be less than the active area of the same acted upon by the pressure in the reverse stroke chamber 42.

Figure 6:
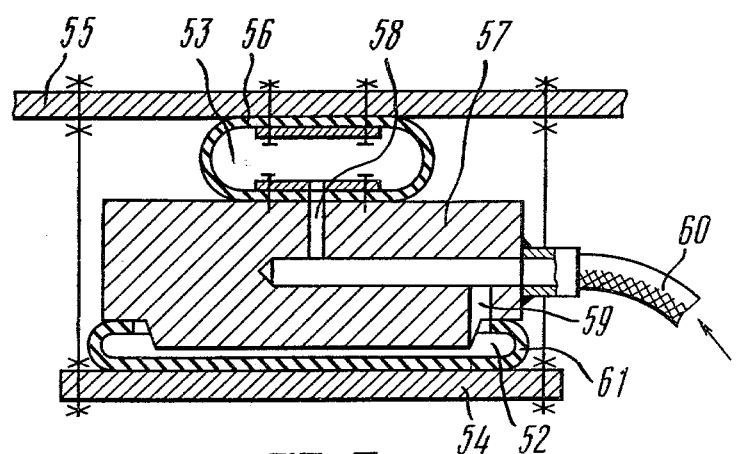
FIG. 6 is a diagrammatic view of the vibrator constructed according to the invention, wherein the reverse stroke chamber is sealed off from the surrounding medium and connected with the forward stroke chamber.

The embodiment of the invention depicted in FIG. 6 is substantially analogous to that in FIG. 5, but differs therefrom in that the reverse stroke chamber 53 (not the forward stroke chamber) is constantly sealed off from the surrounding medium. With this construction, the active impact action is effected on the base 54 instead of on the working platform 55. Here the seal 56 of the reverse stroke chamber 53 is hermetically secured at one side to the working platform 55 and at the other side to the striker 57. The active area of the striker 57 acted upon by the pressure in the reverse stroke chamber 53 is less than the striker active area acted upon by the pressure in the forward stroke chamber 52. The striker 57 is provided with passages 58 for charging with fluid medium the constantly sealed-off reverse stroke chamber 53 and a throttling passage 59 for supplying the fluid medium into the forward stroke chamber 52. The fluid medium is delivered through a base 60 connected directly to the striker 57. In this embodiment of the invention the seal 56 of the reverse stroke chamber 53 and the seal 61 of the forward stroke chamber 52 are of C-section.

In order to increase the vibrator efficiency and reduce the consumption of the fluid medium, the vibrator can be provided with at least one valve designed to alternatively supply the fluid medium into the working chambers. In the embodiment of the invention depicted in FIG. 7 the valve 62 is located in the body of the striker 63 which is provided with a passage 64 for feeding the fluid medium into the forward stroke chamber 65 and a passage 66 for feeding the fluid medium into the reverse stroke chamber 67. The valve space 68 is of annular shape. It connects via a passage 69 with a hose 70 which supplies the fluid medium to the striker 63. The seal 71 of the forward stroke chamber 65 and the seal 72 of the reverse stroke chamber 67 are of C-section and hermetically secured to the striker 63. The base 73 and the working platform 74 are provided with sealing surfaces for the seal flexible edges to make contact therewith. The base 73 is attached to the working platform 74.

Figure 8:
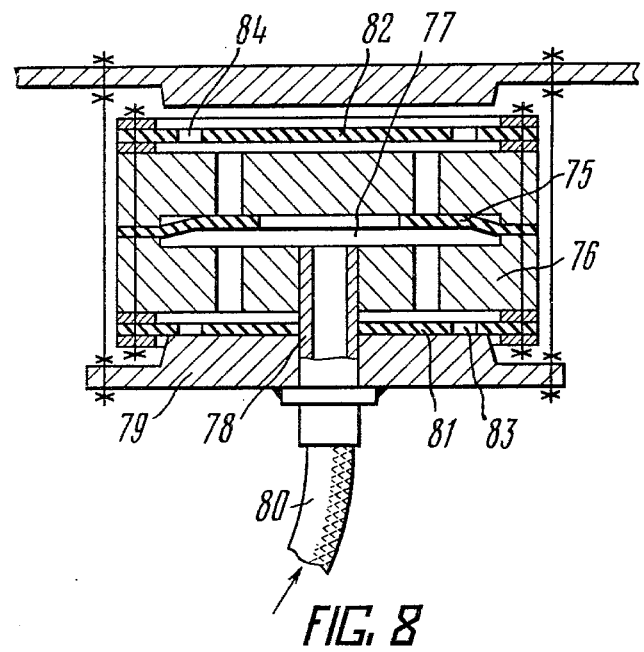
FIG. 8 is a diagrammatic view of the vibrator constructed according to the invention, wherein a valve is provided in the body of the striker, said valve being made in the form of an elastic annular seal.

FIG. 8 shows a substantially analogous vibrator equipped with a valve 75 made of an elastic material in the form of an annular seal and located in the striker 76. The valve space 77 is located centrally in the striker 76. The fluid medium is fed into the valve space 77 via a pipe 78 which is installed in the base 79 and fits into the striker center hole, making a hermetically sealed entry. The pipe 78 also prevents the striker 76 from sidewise displacement in the plane parallel to the base 79. The pipe 78 is connected to a supply hose 80 attached to the base 79. In this embodiment of the invention the seal 81 and the seal 82 are of plain flat shape and have outlet holes 83 and 84 respectively. This simplifies the construction of the seals 81 and 82 and at the same time adds to their strength and life.

Figure 9:
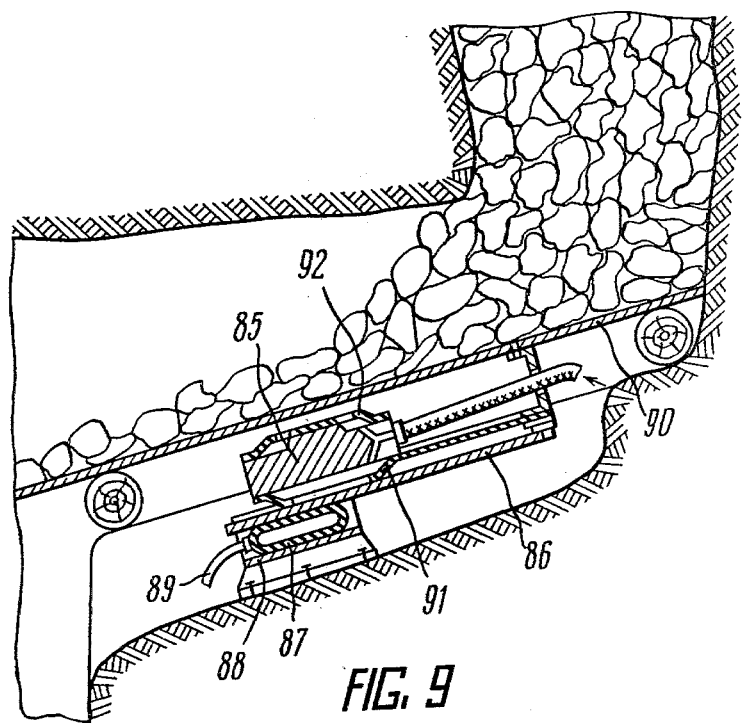
FIG. 9 is a diagrammatic view of the vibrator constructed according to the invention, wherein the regulator of the amplitude of striker oscillation is an elastic bag.

In the embodiment of the invention depicted in FIG. 9 the striker 85 is provided with a regulator for its oscillation amplitude. The regulator is created by attaching the base 86 by means of an articulated connection and mounting it on an up and down adjustment device made in the form of an elastic bag 87 mounted on a plate 88 directly under the base 86. The bag 87 is connected to the fluid medium supply line through a hose 89.

Figure 10:
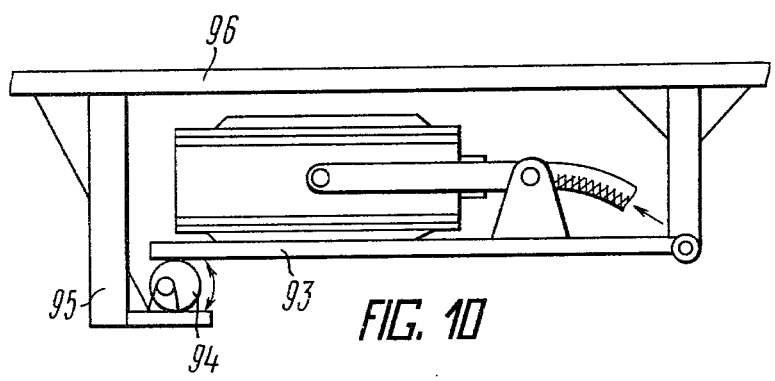
FIG. 10 is a diagrammatic view of the vibrator constructed according to the invention, wherein the regulator of the amplitude of striker oscillation is made as an eccentric.

FIG. 10 shows a substantially analogous vibrator which differs from the previous embodiment only in that its base 93 is adjusted up and down by rotation of eccentrics 94 mounted on brackets 95 secured to the working platform 96.

Figure 11:
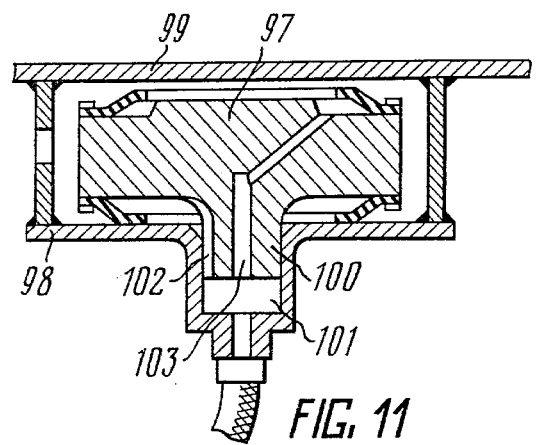
FIG. 11 is a diagrammatic view of the vibrator constructed according to the invention, wherein the striker is mounted on the vibrator base in such a manner as to adapt it for reciprocating between the working plate and the base.

In the embodiment of the invention depicted in FIG. 11 the striker 97 is mounted on the base 98 in such a manner as to adapt it for reciprocating between the working platform 99 and the base 98. It is achieved, for example, by the use of at least one pair of mating guide elements, viz. a stem and a hole. Referring to FIG. 11, the striker 97 is provided with a guide stem 100 disposed to mate with a guide hole 101 provided in the base 98 or in the working platform. This constructional arrangement provides positive guidance of the reciprocation movement of the striker 97. A possible converse solution is to provide a guide stem on the base and a guide hole in the striker. It is desirable that passages 102 and 103 designed to feed the fluid medium into the working chambers be provided in the guide stem 100 and the fluid medium be supplied direct into the space of the guide hole 101. The guide stem 100 and the guide hole 101 can be arranged in the form of a port valve to alternately admit the fluid medium into the working chambers.

The vibrator depicted in FIGS. 1 to 3 operates as follows:

Referring to FIG. 1, the vibrator is in the initial position, i.e. the striker 3 is in the lowermost position and the seal 4 attached thereto is in the initial compressed position, its flexible edge 6 being pressed against the sealing surface 7 of the base 1. When turned on, the fluid medium travels through the hose 19, the passage 18 and the throttling passage 16 into the forward stroke chamber 8 and builds up pressure therein. At the same time the fluid medium goes through the throttling passage 17 into the reverse stroke chamber 13, thence into the outlet passage 15, which is formed as an annular gap between the seal 9 and the working platform 2, and therefrom exhausts into the surrounding medium without causing any substantial overpressure therein. Under the action of the pressure the edge 6 of the seal 4 seals off the forward stroke chamber 8 due to which pressure builds up sharply therein. The pressure buildup in the chamber 8 causes the striker 3 to move rapidly upward, making a forward stroke. The force acting on the striker 3 is equal to its active area taking up the pressure in the chamber 8 multiplied by the pressure in the chamber 8. As the striker 3 moves upward together with the seal 9, the edge 11 of the seal 9 comes into contact with the sealing surface 12 of the working platform 2, thereby sealing off the reverse stroke chamber 13 and giving a start to the process of compressing and charging the chamber with the fluid medium under pressure. Thereafter or at the same time the striker 3 hits the working platform 2 (see FIG. 2), causing it to oscillate. If the elastic spacer 21 is provided between the striker 3 and the working platform 2, the blow becomes softer and of longer duration. By constructing the seal 9 in such a manner as to seal off the reverse stroke chamber 13 earlier, impactless retardation of the striker 3 at the end of its forward stroke can be obtained by virtue of the buffer action of the compressed gas in the reverse stroke chamber 13. In this case the working platform 2 is oscillated by a power impulse arising at the formation of the gas buffer in the reverse stroke chamber 13 and acting therethrough on the working platform 2. Before the striker 3 hits a blow, the seal varies together with the striker pulls the edge 6, at least in one place, off the sealing surface 7 of the base 1, whereby the outlet passage 14 is formed therebetween and the chamber 8 connects therethrough with the surrounding medium. Thus the chamber 8 exhausts through the passage 14. Referring to FIG. 2, due to the circular form of the seal 4 the passage 14 takes the shape of an annular gap between the gap 6 of the seal 4 and the surface 7 of the base 1 all the way around the chamber 8. Thus the passage 14 has a large flow area which facilitates rapid exhaust of the fluid medium from the chamber 8. The flow area of the passage 14 is further increased due to the edge 6 of the seal 4 briskly returning into the initial position in accord with its tendency to flex back toward the striker 3. To expedite the return of edge 6 or at least one portion thereof into the initial position, said edge can be provided with a positive return device which may be constructed, for example, in the form of a spring. After a blow is delivered, the striker 3, under the action of rebound, its own weight and the pressure in the reverse stroke chamber 13, vigorously moves down, making a return stroke.

The seal 9 together with the striker 3 pulls the edge 11 off the sealing surface 12 of the working platform 2, whereby the outlet passage 15 (FIG. 1) is formed therebetween and the chamber 13 connects therethrough with the surrounding medium. The chamber 13 exhausts through the passage 15 rapidly, which is facilitated by the brisk return of the seal edge 11 into the initial position. To prevent the energy acquired by the striker 3 on the reverse stroke from becoming excessive, the flexing-out of the seal edge 11 can be decreased. In this case the reverse stroke chamber 13 becomes unsealed earlier and the working volume of this chamber decreases. At the end of the downward stroke of the striker 3 the seal 4 carried therewith presses its edge 6 against the sealing surface 7 of the base 1, whereby the forward stroke chamber 8 is sealed off. The striker 3 stops either with an impact or without it due to a buffer action in the chamber 8. Thereafter the striker 3 commences its upward movement and the cycle is repeated. The provision of the reverse stroke chamber 13 enables the striker 3 to make a reverse stroke in a shorter period and at the same time to produce some compression in the forward stroke chamber 8. The first makes it possible to substantially raise the frequency of vibrator operation without increasing the pressure of the fluid medium and the active area of the striker 3 acted upon by the pressure in the forward stroke chamber 8. The second makes it possible to increase the reverse stroke of the striker 3 and, consequently, its forward stroke under pressure, which results in greater energy of single vibrator blows. Since the striker 3 has no return springs, it can make a forward stroke more vigorously. Further, the active area of the striker 3 acted upon by the pressure in the chamber 8 can be substantially decreased and by virtue of this the working volume of the chamber 8 can be reduced, whereby the overall dimensions of the vibrator can be lessened. Thus, we have a compact, high-frequency vibrator with a high impact or impactless power and provision for smooth variation of the operating mode, for example, by throttling the fluid medium being supplied.

Vibrators of analogous construction can be very efficiently used for driving high-power vibratory feeders, for example, as shown in FIGS. 1 and 2. In this case effective and powerful impact disturbance of the working platform 2 can be produced at a very high frequency, which makes it possible to speed up the movement of the mined material on the working platform 2 in spite of the tendency of the material to caking and sticking.

The vibrator depicted in FIG. 4 operates substantially in the same manner as the vibrator depicted in FIGS. 1 to 3 except that the reaction of the vibrator rebound is also used to augment the vibration of the working platform 23 by virtue of connecting the base 22 thereto through the use of the links 24 which may be rigid, spring-loaded or elastic. The striker 37 can strike the base 22, thereby producing efficient impact disturbance of said working platform 23 towards the base 22 as well. Hard impact loads can be cushioned by the use of the elastic spacer 39. Inasmuch as the active area of the striker 37 taking up the pressure in the reverse stroke chamber 25 is less than the analogous active area of the striker 37 acted upon by the pressure in the forward stroke chamber 26, the reverse chamber 25 is constructed so as to have a smaller working volume with the result that the energy of the reverse stroke of the striker 37 is reduced. Due to this expedient the impact or impactless loading of the working platform 23 towards the base 22 is less than the energy of the active blows delivered by the striker 37 direct to the working platform 23. The application of different opposite load energy to the working platform 23 may be advantageous in may cases.

By equipping the seal 27 with the limiting device 30 constructed in the form of a spring, provision is made for smoothly timing the commencement of unsealing the chamber 26 to the movement of the striker 37. In this way the working volume of the chamber 26 can be changed and, consequently, the energy of single blows delivered by the striker 37 on its forward stroke can be varied smoothly. For convenience in operation, this adjustment can be made remotely, with the vibrator running, by the use of the flexible shaft 32.

In this embodiment of the invention the limiting device 30 is made in the form of a spring in order to provide for rapid and positive return of the edge 29 of the seal 27 into the initial position after the unsealing of the chamber 26. This expedient provides better exhaust conditions for the chamber 26 and reduces the possibility of a premature buffer action which may be effected by said chamber with the result of reducing the energy of the striker 37 before striking the base 22. In this connection some increase is obtained in the stroke of the striker 37 and, consequently, in the energy of the forward stroke of said striker. By means of this adjustment early sealing-off of the forward stroke chamber 26 can be obtained during the reverse stroke of the striker 37, thereby causing in the chamber 26 a buffer action sufficient to shocklessly stop the striker 37. Thus, impactless operation of the striker 37 on the reverse stroke can be effected at the proper time.

If the analogous limiting device 33 is provided for the reverse stroke chamber 25, the energy of the reverse stroke of the striker 37 can also be varied over a wide range and impactless loading of the working platform 23 can be effected at the proper time by causing a buffer action in the reverse stroke chamber 25. Adjustment by the limiting devices 31 and 33 in combination with change of the throttling of the power supply into each chamber or into both chambers simultaneously provides smooth and less independent variation of the frequency and energy of the impulses of loading the working platform 23 in different directions and over a substantially wide range.

The use of the two-member linkages 38 for preventing the striker 37 from sidewise displacement enables the vibrator to be oriented in space. The attachment of the seal 27 to the base 22 and the seal 28 to the working platform 23 simplifies the construction of the remote-controlled limiting devices 30 and 33. Due to these qualities such vibrators can be put to universal use in numerous machines and mechanisms which employ high-frequency impact or impactless vibratory loading with smooth regulation of the operating mode in each direction of their action on the object.

In the vibrator depicted in FIG. 5 the reverse stroke chamber 42 is periodically sealed off by the seal 46 and operates in the same manner as the working chambers of the vibrators depicted in FIGS. 1 to 4, whereas the forward stroke chamber 40 is constantly sealed off by the seal 41 and operates as a pneumatic or hydraulic spring of practically constant pressure. During operation of the vibrator the fluid medium constantly passes into the chamber 40 and goes through the throttling passage 43 into the reverse stroke chamber 42. To reduce the consumption of the fluid medium, the throttling passage 43 can be replaced with an inlet valve (not shown). When the striker 44 is in the lowermost position as shown in FIG. 5, the reverse stroke chamber 42 is unsealed and the pressure therein does not essentially rise. Inasmuch as the flow area of the feed passage is considerably larger than that of the throttling passage 43, high pressure is maintained in the forward stroke chamber 40. Under the action of said pressure the striker 44 moves rapidly upward and strikes the working platform 48. Before the blow is delivered, the striker 44, by carrying the seal 46 therewith, brings the flexible edge 50 of the seal outlet hole 47 into contact with the sealing surface 49 of the working platform 48. The pressure built up by the entering fluid medium causes the seal 46 to seal off the chamber 42. Since the volume of the chamber 42 at this time is at a minimum, the pressure therein rises rapidly and becomes equal to the pressure in the chamber 40. Inasmuch as the active area of the striker 44 acted upon by the pressure in the reverse stroke chamber 42 is larger than the same acted upon by the pressure in the forward stroke chamber 40, the striker 44, after delivering a blow, starts moving down under the action of rebound, its own weight and the difference between the pressures exerted thereon by the working chambers. During the downward movement of the striker 44 the fluid medium in the chamber 40 is compressed and goes through the passage 43 into the chamber 42. Just as the edge 50 of the seal 46 or at least one portion thereof is pulled off the working platform 48, the chamber 42 is unsealed and the fluid medium is exhausted therefrom. Thereafter the striker 44, expending the acquired energy for compressing the power carrier in the forward stroke chamber 40 on the reverse stroke, stops and begins moving upward, the cycle commencing all over again. At the end of the reverse stroke of the striker 44, due to pressure build-up in the forward stroke chamber 40, the pressure exerted on the base 45 rises and the attendant power impulse is transmitted to the working platform 48, thereby augmenting its vibration. This solution simplifies the construction of the vibrator and makes it possible to effect high-frequency disturbance of the working platform, said distrubance being of impactless nature in one direction and of impact nature in the other.

The vibrator depicted in FIG. 6 is substantially analogous in construction to the vibrator shown in FIG. 5, although it has a rather inverted design. Its operation is also substantially analogous to the previous embodiment, but the active loading is effected on the base.

Figure 7:
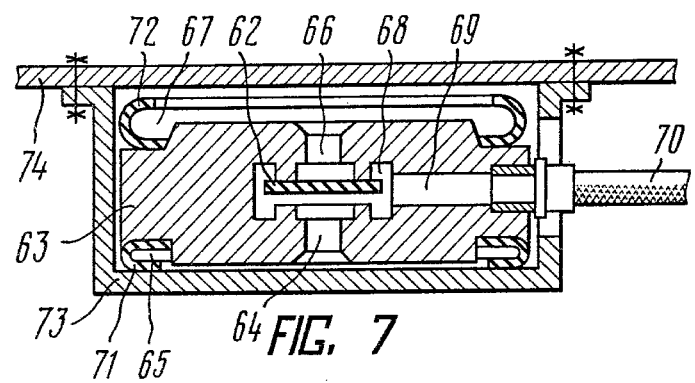
FIG. 7 is a diagrammatic view of the vibrator constructed according to the invention, wherein a valve is provided in the body of the striker.

The vibrator depicted in FIG. 7 operates substantially in the same manner as the embodiments depicted in FIGS. 1 to 4 except that during exhaust of the fluid medium from the vibrator chambers admission thereinto is shut off by the valve 62. When turned on, the fluid medium goes through the hose 70 and the passage 69 into the valve space 68. Before the operation of the vibrator is commenced, the valve 62 under action of its own weight is in the lower position, whereby feed to the forward stroke chamber 65 is shut off and admission to the reverse stroke chamber 67 is permitted. For starting the operation, the valve 62 is provided with a calibrated passage (not shown) via which the forward stroke chamber 65 is slowly charged. When the striker 63 is in the lower position, the reverse stroke chamber 67 communicates with the surrounding medium and, therefore, no pressure rise can occur therein. Thus, the excessive pressure above the valve 62 is close to zero, whilst the pressure under the valve 62 rises. The resultant pressure difference sharply shifts the valve 62 upward, whereby said valve shuts off the feed to the reverse stroke chamber 67 and admits the fluid medium into the forward stroke chamber 65. Under the action of the pressure in the chamber 65 the striker 63 makes a forward stroke and hits the working platform 74. Before the blow is delivered, the reverse stroke chamber 67 is sealed off by the seal 72 and thereafter a compression process begins therein, with the forward stroke chamber 65 is unsealed and exhaust takes place therein. Consequently, the pressure above the valve 62 rises, whereas the pressure thereunderneath lowers. The resultant pressure difference shifts the valve down, whereby the valve shuts off the feed to the chamber 65 and admits the fluid medium into the reverse stroke chamber 67. The striker 63, under the action of rebound, its own weight and the pressure in the chamber 67, makes a reverse stroke and strikes the base 73. By this time the chamber 67 is unsealed and the pressure therein drops, whereas the chamber 65 is sealed off and the pressure therein rises due to the chamber being compressed by the striker 63. The resultant pressure difference shifts the valve 62 upward, whereby the valve shuts off the feed to the chamber 67 and admits the fluid medium into the forward stroke chamber 65. After the blow is delivered, the striker 63, under the action of rebound and the pressure in the chamber 65, moves upward, making a forward stroke, and the cycle is repeated. Thus, when exhaust from the working chambers 65 and 67 starts, the admission of the fluid medium thereinto is discontinued by the valve 62 which shuts off the feed passages 64 and 66, whereby waste of the fluid medium is obviated. This expedient decreases the consumption of the fluid medium and increases the efficiency of the vibrator. Furthermore, inasmuch as the admission of the fluid medium into the chambers 65 and 67 starts when the striker 63 is at the extremities of its stroke, there is nearly no premature buffer action to retard the striker before delivering a blow. This provides increase in the energy of single striker blows and, consequently, increase in the impact power of the vibrator. The obviation of the premature buffer action in the working chambers results in increase of the forward and reverse strokes of the striker 63 effected under the pressure in the working chambers. It also results in augmentation of the energy of single striker blows and in faster completion of the working cycles. Thus, the frequency and energy of single vibrator blows increase still further and, consequently, the impact power of the vibrator becomes greater.

The vibrator constructed according to the present invention is very compact and features high power per unit weight and volume (size). Such vibrators can find the widest field of application. The seals 71 and 72 can also be equipped with devices for limiting the flexing movement of their sealing edges and with devices for their positive return. The addition of the remote control provides rather a universal vibrator construction.

The vibrator depicted in FIG. 8 operates substantially in the same manner as that shown in FIG. 7.

The vibrator depicted in FIG. 9 operates like the embodiment depicted in FIGS. 1 to 4, but differs in that the vibrator base 86 is mounted movably and is supported on an elastic bag 87. By varying the pressure in the bag 87, its size is altered and thereby the position of the base 86 is changed. The bag 87 can be placed at a shorter or longer distance from the working platform 90. This change decreases or increases the amplitude of oscillation of the striker 85 and, consequently, the energy of its single blows due to variation of the distance for which the striker accelerates under pressure.

In this embodiment of the invention it is desirable that the seals 91 and 92 be provided with a device for limiting movement of their sealing edges. This expedient provides wide possibilities of regulating the operating mode of the vibrator. This solution is also advantageous in the cases where during operation of the vibrator the working platform 90 may sag under overload caused by the material being handled, thereby reducing the stroke of the striker 85 with the result that there is no exhaust from the working chambers and the vibrator cannot be set in operation. Should this condition occur, it can be rectified by merely releasing pressure from the bag 87. As a result, the volume of the bag 87 decreases and the base 86 lowers, whereby the working stroke of the striker 85 is restored and the vibrator can operate. After the working platform 90 is relieved of the overload due to the operation of the vibrator, the feed of the fluid medium into the bag 87 is turned on to raise the base 86 to a position suitable for the proper operation of the vibrator, as found by visual observation. This adjustment features convenience in that it can be effected remotely at any distance dictated by the working conditions.

The vibrator depicted in FIG. 10 operates substantially in the same manner as the embodiment shown in FIG. 9 except that up and down adjustment of the base 93 is performed by rotating the eccentrics 94. Further difference lies in that the vibrator recoil reaction on the base 93 is fully transmitted to the working platform 96.

The vibrator depicted in FIG. 11 operates substantially in the same manner as those described above and need not be explained further.

It is to be understood that the embodiments of the invention depicted in the drawings and described above are essentially possible and in some cases preferable variants and other embodiments, as regards the form, size and position of the individual parts and their elements, may be used. For example, the parts and elements thereof depicted in the drawings and described above may be replaced with equivalent components, the position of some parts and elements thereof may be changed, and some elements of the invention may be used independently of one another, of course within the essence and scope of the following claims.

Vibrators constructed according to the present invention have been put to exhaustive tests in bulk material handling by means of vibratory conveyances and estimated by comparison with vibrators known in the prior art. The tests have shown that the vibrators constituting the present invention perform efficiently and dependably in any difficult conditions, in moist, wet, dusty and abrasive media and even when the power fluid contains much foreign matter, for example, rust and grit. The high-frequency impact loading of the vibrating platform effected at low pre-impact striker speeds has proved to be more efficient in many cases, the handling capacity is increased and the movement of materials liable to caking and sticking is smoother. No worsening of any other characteristics, as compared with the vibrators known in the prior art, has been observed.

What is claimed is:

1. A vibrator operated by a fluid medium under pressure for the purpose of imparting vibration to a working platform carrying the material being handled, comprising: a base; a forward stroke chamber formed by a continuous seal situated on the side of said vibrator base facing the working platform; a striker mounted on said forward stroke chamber seal and adapted to interact with said working platform under the action of the fluid medium for the purpose of imparting vibration to said working platform; a reverse stroke chamber formed by an additional continuous seal situated on the side of said striker facing said working platform and connected to the source of the fluid medium wherein one of said chambers is alternately sealed off from the surrounding medium and is connected with the other chamber by means of a passage provided in the striker.

2. A vibrator as claimed in claim 1, wherein the working volume of the reverse stroke chamber is less than the working volume of the forward stroke chamber.

3. A vibrator as claimed in claim 1, wherein the feed line designed to feed the fluid medium to the working chambers is connected to a passage provided in the body of the striker and connected to the forward and reverse stroke chambers.

4. A vibrator as claimed in claim 1, wherein provision is made of at least one valve designed to alternately feed the fluid medium to said working chambers.

5. A vibrator as claimed in claim 4, wherein said valve is situated in the body of said striker.

6. A vibrator as claimed in claim 1, wherein provision is made for regulating the amplitude of oscillation of the striker.

7. A vibrator as claimed in claim 1, wherein the striker is mounted on the base or the working platform in such a manner as to adapt it for reciprocating between said working platform and said base.

8. A vibrator as claimed in claim 2, wherein one of said chambers is alternately sealed off from the surrounding medium and is connected with the other chamber by means of a passage provided in the striker.

9. A vibrator as claimed in claim 2, wherein the feed line designed to feed the fluid medium to the working chambers is connected to a passage provided in the body of the striker and connected to the forward and reverse stroke chambers.

10. A vibrator as claimed in claim 2, wherein provision is made of at least one valve designed to alternately feed the fluid medium to said working chambers.

11. A vibrator as claimed in claim 2, wherein provision is made for regulating the amplitude of oscillation of the striker.

12. A vibrator as claimed in claim 2, wherein the striker is mounted on the base or the working platform in such a manner as to adapt it for reciprocating between said working platform and said base.

13. A vibrator as claimed in claim 4, wherein provision is made of at least one valve designed to alternately feed the fluid medium to said working chambers.

14. A vibrator as claimed in claim 4, wherein provision is made for regulating the amplitude of oscillation of the striker.

15. A vibrator as claimed in claim 3, wherein the striker is mounted on the base or the working platform in such a manner as to adapt it for reciprocating between said working platform and said base.

16. A vibrator as claimed in claim 4, wherein provision is made for regulating the amplitude of oscillation of the striker.

17. A vibrator as claimed in claim 4, wherein the striker is mounted on the base or the working platform in such a manner as to adapt it for reciprocating between said working platform and said base.

18. A vibrator as claimed in claim 5, wherein the striker is mounted on the base or the working platform in such a manner as to adapt it for reciprocating between said working platform and said base.

* * * * *